(12) United States Patent
Lee et al.

(10) Patent No.: US 10,829,635 B2
(45) Date of Patent: Nov. 10, 2020

(54) ECONOMICAL METHOD OF PREPARING A RESIN COMPOSITION INCLUDING POLYALKYLENE CARBONATE WITH IMPROVED THERMAL STABILITY AND PROCESSABILITY

(71) Applicant: LG CHEM, LTD., Seoul (KR)

(72) Inventors: Jun Wye Lee, Daejeon (KR); Seung Young Park, Daejeon (KR); Jin Woo Lee, Daejeon (KR); Hyun Ju Cho, Daejeon (KR); Jung Min Sohn, Daejeon (KR); Yoon Jung Kim, Daejeon (KR); Bo Hyun Seong, Daejeon (KR); Taek Jun Jung, Daejeon (KR); Yun Ki Cho, Daejeon (KR); Yong Hee An, Daejeon (KR); Sung-Kyoung Kim, Daejeon (KR); Hyun Min Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 363 days.

(21) Appl. No.: 15/769,648

(22) PCT Filed: Mar. 8, 2017

(86) PCT No.: PCT/KR2017/002521
§ 371 (c)(1),
(2) Date: Apr. 19, 2018

(87) PCT Pub. No.: WO2017/155306
PCT Pub. Date: Sep. 14, 2017

(65) Prior Publication Data
US 2018/0305542 A1 Oct. 25, 2018

(30) Foreign Application Priority Data
Mar. 11, 2016 (KR) .................. 10-2016-0029833

(51) Int. Cl.
| | |
|---|---|
| *C08L 69/00* | (2006.01) |
| *B29B 9/06* | (2006.01) |
| *C08J 3/09* | (2006.01) |
| *C08G 64/34* | (2006.01) |
| *C08G 64/40* | (2006.01) |
| *C08G 64/02* | (2006.01) |
| *B29K 69/00* | (2006.01) |
| *B29K 105/00* | (2006.01) |

(52) U.S. Cl.
CPC ............. *C08L 69/00* (2013.01); *B29B 9/06* (2013.01); *C08G 64/0208* (2013.01); *C08G 64/34* (2013.01); *C08G 64/40* (2013.01); *C08J 3/09* (2013.01); *B29K 2069/00* (2013.01); *B29K 2105/0014* (2013.01); *C08J 2369/00* (2013.01); *C08J 2467/04* (2013.01)

(58) Field of Classification Search
USPC ................................................ 528/196, 198
See application file for complete search history.

(56) References Cited

U.S. PATENT DOCUMENTS

| | | |
|---|---|---|
| 4,943,677 A | 7/1990 | Rokicki |
| 4,946,884 A | 8/1990 | Kuphal et al. |
| 4,981,948 A | 1/1991 | Kawachi et al. |
| 8,546,514 B2 | 10/2013 | Chang et al. |
| 9,458,285 B2 | 10/2016 | Kim et al. |
| 9,475,751 B2 | 10/2016 | Ooms et al. |
| 2009/0203933 A1 | 8/2009 | Ryu |
| 2010/0130751 A1 | 5/2010 | Nisbet et al. |
| 2011/0054145 A1 | 3/2011 | Chang et al. |
| 2011/0309539 A1 | 12/2011 | Steinke et al. |
| 2012/0065360 A1 | 3/2012 | Jeong et al. |
| 2012/0130110 A1 | 5/2012 | Ooms et al. |
| 2012/0165479 A1 | 6/2012 | Hong et al. |
| 2013/0233826 A1 | 9/2013 | Seko et al. |
| 2014/0326313 A1 | 11/2014 | Hong et al. |
| 2015/0094402 A1 | 4/2015 | Hong et al. |
| 2016/0083512 A1 | 3/2016 | Kamada et al. |
| 2016/0145431 A1 | 5/2016 | Cho et al. |
| 2017/0081433 A1 | 3/2017 | Kim |

FOREIGN PATENT DOCUMENTS

| | | |
|---|---|---|
| CN | 1040375 A | 3/1990 |
| CN | 105051108 A | 11/2015 |
| JP | 02-047134 A | 2/1990 |
| JP | 02-097525 A | 4/1990 |
| JP | 2003146983 A | 5/2003 |
| JP | 2004010519 A | 1/2004 |
| JP | 2006104095 A | 4/2006 |
| JP | 2006-335905 A | 12/2006 |
| JP | 2010525010 A | 7/2010 |
| JP | 2013-503935 A | 2/2013 |
| JP | 2013-214040 A | 10/2013 |
| JP | 2014058602 A | 4/2014 |
| JP | 2014214295 A | 11/2014 |
| JP | 2015-502986 A | 1/2015 |
| JP | 2016501287 A | 1/2016 |

(Continued)

OTHER PUBLICATIONS

"Copolymerization of Carbon Dioxide and Epoxide", 3. Journal of Polymer Science, Polymer Letters, vol. 7, pp. 287-292 (1969).

(Continued)

*Primary Examiner* — Terressa Boykin
(74) *Attorney, Agent, or Firm* — Dentons US LLP

(57) ABSTRACT

The present disclosure relates to an economical method of preparing a resin composition including a polyalkylene carbonate with improved thermal stability and processability. More specifically, the method of preparing a resin composition includes the steps of polymerizing carbon dioxide and an epoxide compound in the presence of a zinc-based catalyst and a solvent, recovering monomers, removing the catalyst and recovering raw materials, solution-blending with a thermostable resin to improve the thermal stability and processability, and removing the solvent and byproducts from the reaction mixture by using an agitated flash drum and an extrusion or kneader-type devolatilizer.

16 Claims, 1 Drawing Sheet

(56) References Cited

FOREIGN PATENT DOCUMENTS

| KR | 10-2007-0016666 A | | 2/2001 | |
| KR | 10-2006-0130395 A | | 12/2006 | |
| KR | 10-0668043 B1 | | 1/2007 | |
| KR | 10-2008-0017159 A | | 2/2008 | |
| KR | 10-2010-0017447 A | | 2/2010 | |
| KR | 10-2011-0024847 A | | 3/2011 | |
| KR | 10-2011-0127727 A | | 11/2011 | |
| KR | 10-2012-0048478 A | | 5/2012 | |
| KR | 10-2013-0048270 A | | 5/2013 | |
| KR | 10-2013-0076231 A | | 7/2013 | |
| KR | 10-2013-0124082 A | | 11/2013 | |
| KR | 10-2014-0118881 | * | 3/2014 | ............. C08L 69/00 |
| KR | 10-1401925 B1 | | 6/2014 | |
| KR | 10-1432506 B1 | | 8/2014 | |
| KR | 10-2014-0118881 A | | 10/2014 | |
| KR | 10-2015-0029367 A | | 3/2015 | |
| KR | 10-1497042 B1 | | 3/2015 | |
| KR | 10-1529977 B1 | | 6/2015 | |
| KR | 10-2015-0084859 A | | 7/2015 | |
| KR | 10-2016-0004730 A | | 1/2016 | |
| KR | 10-2016-0047930 A | | 5/2016 | |
| KR | 10-2017-0034757 A | | 3/2017 | |
| KR | 10-1794912 B1 | | 12/2017 | |
| WO | 2009022237 A2 | | 2/2009 | |
| WO | 2011/142259 A1 | | 11/2011 | |
| WO | 2013007759 A1 | | 1/2013 | |

OTHER PUBLICATIONS

Acemoglu et al., "Poly(ethylene carbonate)s, part I: Synthesis and structural effects on biodegredation", Journal of Controlled Release, vol. 49, Issues 2-3, Dec. 15, 1997, pp. 263-276.

Xu Nai,"Modification, processing and Molding of General Purpose PLA", 1st edition, pp. 8-9, University of science and technology of China Press with English translation.

* cited by examiner

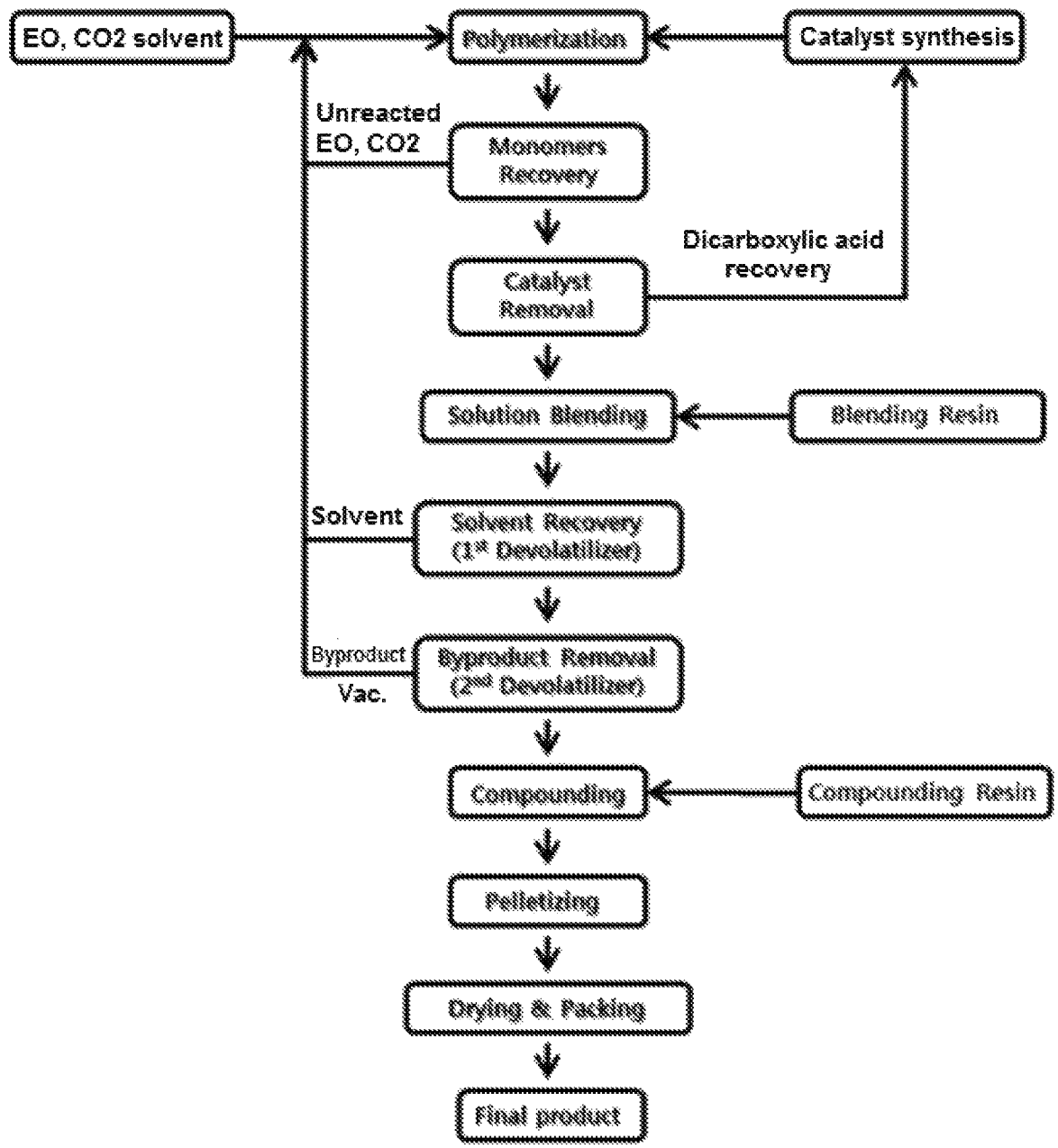

ECONOMICAL METHOD OF PREPARING A RESIN COMPOSITION INCLUDING POLYALKYLENE CARBONATE WITH IMPROVED THERMAL STABILITY AND PROCESSABILITY

CROSS-REFERENCE TO RELATED APPLICATION

This application is a National Stage Application of International Application No. PCT/KR2017/002521, filed on Mar. 8, 2017, which claims the benefit of Korean Patent Application No. 10-2016-0029833, filed on Mar. 11, 2016, all of which are hereby incorporated by reference in their entirety for all purposes as if fully set forth herein.--

TECHNICAL FIELD

The present disclosure relates to an economical method of preparing a resin composition including a polyalkylene carbonate with improved thermal stability and processability.

BACKGROUND OF ART

A polyalkylene carbonate is a non-crystalline transparent resin. Unlike aromatic polycarbonates that are engineering plastics of a similar type, the polyalkylene carbonate only has an aliphatic structure, and is synthesized by copolymerizing carbon dioxide and epoxide as direct monomers (main raw materials) in the presence of a catalyst. The polyalkylene carbonate has excellent transparency, elongation, and oxygen barrier properties, exhibits biodegradability, and is completely decomposed into carbon dioxide and water during combustion, leaving no carbon residue.

Along with these advantages, however, the polyalkylene carbonate has poor thermal stability and poor processability. Thus, when processed into a pellet or film using an extruder or the like, the polyalkylene carbonate has disadvantages that not only is the processing temperature range very narrow, but also the resin is easily decomposed even by a slight increase in the processing temperature, which makes processing difficult. Further, since a blocking phenomenon occurs due to adhesion between the pellets after pelletizing, the pellets are not easily handled and stored, and the dimensional stability of the resin is deteriorated.

On the other hand, when the polyalkylene carbonate is synthesized by a copolymerization reaction using a catalyst, cyclic alkylene carbonates are synthesized as reaction byproducts. These alkylene carbonates are additionally generated by decomposition of the polyalkylene carbonate synthesized by copolymerization or depolymerization by a catalyst residue after the polymerization. When the content of the alkylene carbonate is more than the proper level, not only is the glass transition temperature of the resin lowered to make the adhesion problem between resins worse, but also the mechanical strength such as tensile strength is lowered and the oxygen blocking performance of the film is decreased during the production of the film, making it difficult to be applied for various uses. Therefore, it is necessary to effectively remove the catalyst after the polymerization reaction, and to keep the catalyst residue in the polymerization reaction mixture within a certain amount. In addition, it is necessary to remove the alkylene carbonate obtained as reaction byproducts in the polymerization reaction from the process, and to control the content of the alkylene carbonate in the final resin within an appropriate level. It is also very important to solve this problem through an economical process.

DETAILED DESCRIPTION OF THE INVENTION

Technical Problem

The present disclosure is to provide a method of preparing a resin composition including a polyalkylene carbonate. By including the steps of a polymerization reaction, recovery of residual monomers, removal of a catalyst residue, recovery of raw materials of a catalyst, low temperature solution blending, recovery of a solvent, removal of byproducts, extrusion, drying, and the like, the present disclosure provides a method for economically preparing a resin having excellent thermal stability and processability.

Technical Solution

The present disclosure provides a method of preparing a resin composition containing a polyalkylene carbonate, including the steps of:

(a) polymerizing using a zinc-based catalyst, a solvent, carbon dioxide, and an epoxide compound;

(b) recovering unreacted residual monomers from a polymerization solution obtained after the polymerization step and containing a polyalkylene carbonate, unreacted residual monomers, a catalyst residue, a solvent, and cyclic alkylene carbonate-based byproducts;

(c) removing the catalyst residue from the polymerization solution and recovering raw materials of a catalyst;

(d) solution-blending by mixing the polymerization solution containing the polyalkylene carbonate, the solvent, and the cyclic alkylene carbonate-based byproducts with a thermostable blending resin to prepare a resin composition containing the polyalkylene carbonate;

(e) recovering the solvent from the resin composition containing the polyalkylene carbonate; and (f) removing the cyclic alkylene carbonate-based byproducts from the resin composition containing the polyalkylene carbonate.

The step (a) of polymerizing may further include controlling the molecular weight of the polyalkylene carbonate resin obtained by polymerization by controlling the moisture content in the reaction mixture before initiation of the polymerization reaction to 10 to 1000 ppm.

The step (b) of recovering unreacted residual monomers may include removing the unreacted residual monomers from the polymerization solution by using a venting method, a simple flash drum, a falling film evaporator, a thin film evaporator, or a combination thereof.

The step (c) of removing the catalyst residue may include removing the catalyst residue from the polymerization solution by a method using an ion exchange resin, a filtration method selected from the group consisting of a metal filter, a polymer filter, and a centrifuge, or a combination thereof.

The step (c) of recovering raw materials of a catalyst may include removing the catalyst residue from the polymerization solution by using an ion exchange resin, precipitating the raw materials of the catalyst on the surface of the ion exchange resin, and recovering the raw materials of the catalyst by using water, or recovering the catalyst from the polymerization solution by using a metal filter, a polymer filter, or a centrifuge, passing through an ion exchange resin to precipitate the raw materials of the catalyst on the surface of the ion exchange resin, and recovering the raw materials of the catalyst by using water.

The step (d) of solution-blending may include preparing a resin composition containing the polyalkylene carbonate by adding the thermostable blending resin dissolved in the solvent into the polymerization solution containing the polyalkylene carbonate by using a stirrer mixer, a tank reactor, or an extruder to make the weight ratio of the polyalkylene carbonate to the thermostable blending resin of 99:1 to 10:90, and then solution-blending.

The step (d) of solution-blending may include a step of blending in a solution state after introducing the thermostable blending resin having compatibility with the polyalkylene carbonate and solubility in the solvent used in the polymerization directly into the polymerization solution containing the polyalkylene carbonate in which the catalyst residue has been removed in accordance with a targeted weight ratio, or first dissolving the thermostable blending resin in the solvent, and then introducing it into the polymerization solution containing the polyalkylene carbonate.

The blending resin may be at least one selected from the group consisting of polylactide, polymethyl methacrylate, and cellulose acetate.

The step (e) of recovering the solvent may include recovering the solvent in a content of at least 60 wt % in the polymerization solution by volatilizing the solvent while extruding or kneading the polymerization solution through a co-extrusion or kneading method using a twin-screw extrusion devolatilizer or a kneader-type devolatilizer at a temperature of 40° C. to 150° C. and at atmospheric pressure to a vacuum.

The step (f) of removing the byproducts may include removing the byproducts and the remaining solvent from the polymerization solution using an extrusion devolatilizer or a kneader-type devolatilizer at a temperature of 120° C. to 200° C. and a degree of vacuum of 1 Torr to 500 Torr.

After the step (f) of removing the byproducts, the method may further include the step (g) of obtaining the resin composition containing the polyalkylene carbonate in the form of pellets through a pelletizing process and a drying process of the resin composition containing the polyalkylene carbonate in which byproducts were removed.

In addition, after the step of removing the byproducts of the resin composition containing the polyalkylene carbonate, the method may include the step of further compounding and pelletizing the resin composition containing the polyalkylene carbonate with the thermostable compounding resin.

The thermostable compounding resin may be at least one selected from the group consisting of polylactide, polymethyl methacrylate, cellulose acetate, polyoxymethylene, polyketone, and polyamide.

Further, the step of preventing blocking between the pellets by adding at least one additive selected from the group consisting of silica, calcium carbonate, cellulose, ethylene bis(stearamide) (EBS), and polymer powder may be further included.

The steps of polymerizing to remove the byproducts may be carried out by a continuous or batch type of process.

According to the present disclosure, a final resin composition may have a metal content of the catalyst of less than 300 ppm, a solvent content of 0.5 wt % or less, and a cyclic alkylene carbonate byproduct content of 2 wt % or less.

The zinc-based catalyst may be a zinc dicarboxylate-based catalyst prepared by reacting a zinc-based precursor with a C3 to C20 dicarboxylic acid.

The epoxide compound may be at least one selected from the group consisting of a C2 to C20 alkylene oxide substituted or unsubstituted with a halogen or a C1 to C5 alkyl group; a C4 to C20 cycloalkylene oxide substituted or unsubstituted with a halogen or a C1 to C5 alkyl group; and a C8 to C20 styrene oxide substituted or unsubstituted with a halogen or a C1 to C5 alkyl group, and the solvent may be at least one selected from the group consisting of methylene chloride, 1,2-dichloroethane, n-methyl pyrrolidone, dimethylsulfoxide, 1,4-dioxane, and 1,3-dioxolane.

A molar ratio of the epoxide compound:zinc-based catalyst may be 50:1 to 400:1 in the polymerization step, and the polymerization may be carried out at a polymerization temperature of 50 to 90° C. and a polymerization pressure of 15 to 50 bar for 1 to 60 hours.

Advantageous Effects

The present disclosure relates to a method of preparing a resin composition including a polyalkylene carbonate, which includes blending a resin capable of improving thermal stability at a low temperature and in a solution state to prepare a mixture composition including the polyalkylene carbonate in order to improve the low thermal stability and processability which are disadvantages of the polyalkylene carbonate, and then removing the solvent and reaction byproducts at a high temperature. Therefore, it is possible to obtain a polyalkylene carbonate resin composition which is excellent in thermal stability and processability and can be easily processed into a film or sheet through well-known processing methods such as extrusion, calendering, and the like. In addition, the present disclosure can effectively control the content of reaction byproducts in the resin composition, which deteriorates processability and physical properties, by removing reaction byproducts in a state in which decomposition of the resin at a high temperature is restricted. Further, since the resin used for improving thermal stability in the present disclosure is mixed with the polyalkylene carbonate in a liquid phase solution, a highly homogeneous mixture having a very high degree of mixing and no interface between the resins can be obtained.

Furthermore, after the polymerization of the polyalkylene carbonate, the residual monomers and the solvent can be recovered and reused, and the dicarboxylic acid as a raw material of the catalyst can be recovered to improve economic efficiency of the catalyst. In addition, the present disclosure effectively removes reaction byproducts formed by the polymerization at high temperature and high vacuum, thereby ensuring economic efficiency in view of the manufacturing cost of the resin. Moreover, the present disclosure can stably and economically prepare the polyalkylene carbonate resin composition in a continuous or batch type of method from the feeding of polymerization raw materials to pelletizing.

BRIEF DESCRIPTION OF THE DRAWINGS

FIG. 1 is a process diagram of a method of preparing a resin composition including a polyalkylene carbonate according to an embodiment of the present disclosure.

DETAILED DESCRIPTION OF THE EMBODIMENTS

Hereinafter, the present disclosure will be described in detail. It should be understood that the terms used in the specification and claims should not be limited to general and dictionary meanings, but are to be interpreted based on the meanings and concepts corresponding to technical aspects of the present disclosure based on the principle that the inventor is allowed to define terms in order to explain his own invention in the best way.

Also, as used herein, the meaning of "comprising", "including", and "having" embodies specific features, regions, integers, steps, operations, elements, and/or components, and does not exclude the presence or addition of other features, regions, integers, steps, operations, elements, and/or components.

Hereinafter, the economical method of preparing a resin composition including a polyalkylene carbonate with excellent thermal stability and processability according to the exemplary embodiments of the present disclosure will be described in more detail.

The present disclosure provides a method of preparing a resin composition including a polyalkylene carbonate, the method including the steps of: polymerizing using a zinc-based catalyst, a solvent, carbon dioxide, and an epoxide compound; recovering unreacted residual monomers; removing the catalyst residue and recovering raw materials of the catalyst; solution-blending by mixing a thermostable blending resin to prepare a resin composition including the polyalkylene carbonate; recovering the solvent; and removing the byproducts.

Specifically, the present disclosure may provide a method of preparing a resin composition including a polyalkylene carbonate, the method including the steps of:

(a) polymerizing using a zinc-based catalyst, a solvent, carbon dioxide, and an epoxide compound;

(b) recovering unreacted residual monomers from a polymerization solution obtained after the polymerization step and containing a polyalkylene carbonate, unreacted residual monomers, a catalyst residue, a solvent, and cyclic alkylene carbonate-based byproducts;

(c) removing the catalyst residue from the polymerization solution and recovering raw materials of the catalyst;

(d) solution-blending by mixing the polymerization solution containing the polyalkylene carbonate, the solvent, and the cyclic alkylene carbonate-based byproducts with a thermostable blending resin to prepare a resin composition containing the polyalkylene carbonate;

(e) recovering the solvent from the resin composition containing the polyalkylene carbonate; and (f) removing the cyclic alkylene carbonate-based byproducts from the resin composition containing the polyalkylene carbonate.

The present disclosure relates to a method of preparing a resin composition including a polyalkylene carbonate, which includes recovering and reusing residual monomers, raw materials of the catalyst, and a solvent after the polymerization of the polyalkylene carbonate and effectively removing byproducts, making it possible to construct a process which ensures economic efficiency. Further, since the polyalkylene carbonate resin composition can be prepared in a continuous or batch type of process from the feeding of polymerization raw materials, the present disclosure may ensure a process having high productivity and flexibility. In addition, the present disclosure effectively removes catalyst residues and reaction byproducts that adversely affect the physical properties of the product, thereby making it possible to prepare a resin product capable of achieving improved physical properties. Further, the present disclosure may remove the catalyst and recover the dicarboxylic acid as a raw material of the catalyst in the same manner as using an ion exchange resin.

Particularly, in order to more effectively remove the solvent and byproducts present in the reaction mixture after the polyalkylene carbonate polymerization process and maximize the degree of mixing between the resins, the present disclosure carries out solution-blending at a low temperature in advance, and then removing the solvent and the reaction byproducts using an agitated flash drum, extrusion, or kneader devolatilization process at a higher temperature. This makes it possible to prepare a polyalkylene carbonate resin composition having very high uniformity and a well-controlled byproducts content, and the obtained resin composition exhibits excellent thermal stability and processability. Further, the present disclosure provides a polyalkylene carbonate resin composition which is easy to compound with various resins, so that various products can be produced through post-processing.

The economical method of preparing a resin composition including a polyalkylene carbonate according to a preferred embodiment of the present disclosure will now be described in detail with reference to the drawings.

FIG. 1 is a process diagram of a method of preparing a resin composition including a polyalkylene carbonate according to an embodiment of the present disclosure.

As shown in FIG. 1, the method of the present disclosure includes a polymerization process using a catalyst, an epoxide compound, carbon dioxide, and a solvent, a monomer recovery process, a catalyst removal and recovery process, a solution blending process, a solvent recovery process, and a byproduct removal process.

The catalyst removal and recovery process may further include the step of recovering the dicarboxylic acid as a raw material of the catalyst through the ion exchange resin.

The solution blending process may include the step of directly adding the thermostable blending resin such as polylactide (PLA), polymethylmethacrylate (PMMA), cellulose acetate (CA), and the like, which is more thermally stable than the polyalkylene carbonate and is dissolved in the solvent, into the polymerization solution containing the polyalkylene carbonate whose catalyst residue has been removed in accordance with the targeted weight ratio, or dissolving it in a solvent in advance and then mixing it with the polymerization solution in a liquid solution state.

The solvent recovery process may include a solvent removing step using a stirring mixer such as an agitating flash drum, an evaporator, a kneader, or an extrusion devolatilizer to effectively recover and remove the solvent from the reaction mixture. In addition, the byproduct removal process may include the step of extrusion devolatilization or kneader devolatilization from a high viscosity polymerization solution under high temperature and high vacuum conditions in an extruder or kneader.

The present disclosure may also include a pelletizing process of the polyalkylene carbonate, and a final product recovery process after the byproduct removal process. The pelletizing process can be carried out in a method that is well known in the art, such as strand pelletizing and underwater pelletizing, and is not limited to the conditions.

Further, in preparing the polyalkylene carbonate resin composition of the present disclosure, the resin composition may be prepared by additionally compounding another resin component that is compatible with the polyalkylene carbonate. For example, the resin composition may be prepared through compounding between the byproduct removal process and the pelletizing process, or after the pelletizing process by injecting other resin components. Therefore, according to another embodiment of the present disclosure, after the byproduct removal process, the method may include the steps of preparing a resin composition containing the polyalkylene carbonate by compounding the polyalkylene carbonate with a polylactide, and pelletizing the resin composition.

In the present disclosure, the steps of polymerizing to remove the byproducts, or the steps of polymerizing to preparing a resin composition, may be carried out in a continuous or batch type of process. In addition, when a pelletizing process is included, the method of the present disclosure can be carried out in a continuous or batch type of process from the polymerization process to the pelletization process.

According to a more preferred embodiment, the method may include the steps of: polymerizing using carbon dioxide, and an epoxide compound in the presence of a zinc-based catalyst and a solvent; recovering monomers from the reaction mixture obtained after the polymerization step and containing a polyalkylene carbonate, a catalyst, unreacted residual monomers, a solvent, and alkylene carbonate-based byproducts; removing the catalyst from the reaction mixture and recovering raw materials of the catalyst; solution-blending (mixing) the reaction mixture with a blending resin, which is more thermally stable than the polyalkylene carbonate and compatible, after being dissolved in the solvent; recovering the solvent from the reaction mixture using a stirring mixer, an evaporator, a kneader, or an extrusion devolatilizer; and removing the byproducts from the reaction mixture by extrusion or kneader devolatilization under high temperature and high vacuum conditions.

According to another preferred embodiment, the method may include the steps of: polymerizing using carbon dioxide, and an epoxide compound in the presence of a zinc-based catalyst and a solvent; recovering monomers from the reaction mixture obtained after the polymerization step and containing a polyalkylene carbonate, a catalyst, unreacted residual monomers, a solvent, and alkylene carbonate-based byproducts; removing the catalyst from the reaction mixture and recovering raw materials of the catalyst; solution-blending (mixing) the reaction mixture with a blending resin, which is more thermally stable than the polyalkylene carbonate and compatible, after being dissolved in the solvent to prepare a resin composition containing the polyalkylene carbonate; recovering the solvent from the reaction mixture using a stirring mixer, an evaporator, a kneader, or an extrusion devolatilizer; removing the byproducts from the reaction mixture by extrusion or kneader devolatilization under high temperature and high vacuum conditions; and compounding with another blending resin, which is more thermally stable than the polyalkylene carbonate, and compatible, to prepare a resin composition containing the polyalkylene carbonate.

In the present disclosure, the steps of polymerizing to removing the byproducts may be carried out in a continuous or batch type of process.

Hereinafter, each step of the present disclosure will be described in more detail.

Synthesis of Catalyst

First, in order to proceed with the polymerization process of the polyalkylene carbonate in the present disclosure, a catalyst and monomers are required. At this time, the catalyst used is a zinc-based catalyst, which means an organic zinc catalyst. In the present disclosure, the zinc-based catalyst is synthesized in the following manner and used.

According to an embodiment of the present disclosure, a method of preparing a zinc-based catalyst includes a step of reacting a zinc precursor with a C3 to C20 dicarboxylic acid to form a zinc dicarboxylate-based catalyst.

Any zinc precursor previously used in the preparation of a zinc dicarboxylate-based catalyst can be used without limitation. Specific examples of the zinc precursor include zinc oxide (ZnO), zinc sulfate ($ZnSO_4$), zinc chlorate ($Zn(ClO_3)_2$), zinc nitrate ($Zn(NO_3)_2$), zinc acetate ($Zn(OAc)_2$), zinc hydroxide, or the like.

As the dicarboxylic acid reacting with the zinc precursor, any C3 to C20 dicarboxylic acid can be used. More specifically, aliphatic dicarboxylic acids selected from the group consisting of malonic acid, glutaric acid, succinic acid, and adipic acid, or aromatic dicarboxylic acids selected from the group consisting of terephthalic acid, isophthalic acid, homophthalic acid, and phenylglutaric acid, may be used. In addition, aliphatic or aromatic dicarboxylic acids having 3 to 20 carbon atoms may be used. However, in view of the activity of the organic zinc catalyst, it is preferable that the dicarboxylic acid is glutaric acid and the zinc dicarboxylate-based organic zinc catalyst is a zinc glutarate-based catalyst.

In addition, any organic or aqueous solvent may be used in the method of preparing the zinc-based catalyst. For example, the solvent may include at least one solvent selected from the group consisting of toluene, hexane, dimethylformamide, acetone, methanol, ethanol, and water. When a liquid medium is used in the step of reacting the zinc precursor and the dicarboxylic acid, the solvent used for dispersing the zinc precursor may preferably have the same properties as the liquid medium. Also, the organic solvent such as toluene may be used in the step of synthesizing the catalyst, and acetone, methanol, ethanol, and the like may be used in the step of washing after the catalyst is synthesized.

In a more specific embodiment of the present disclosure, the appropriate amount of the solvent for the synthesis of the catalyst (for example, toluene) is preferably 5 to 50 times molar ratio of 1 mol of the dicarboxylic acid. When the molar ratio of the solvent is less than 5 times, the efficiency of agitating may be lowered. And, when the molar ratio of the solvent exceeds 50 times, sufficient reaction between the monomers may not occur.

The zinc precursor may be added in the form of a solution or dispersion containing the solvent, and may be added after heating. The zinc precursor may be added several times, for example, by being divided into two or more additions. The method of dividing and adding is not particularly limited, and may be carried out in several ways.

First, in one example, after obtaining solutions or dispersions each containing the zinc precursor in an amount of one-half to one-tenth of the total amount of the zinc precursor, these solutions or dispersions may be added to the solution or dispersion containing the dicarboxylic acid by dividing them into two to ten additions at an equal time interval during the reaction. At this time, preferably, the total amount of the zinc precursor may be divided into two to five parts to obtain each solution or dispersion, and these solutions or dispersions may be added by dividing them into two to five additions. This makes it possible to prepare the organic zinc catalyst exhibiting improved activity by effectively maintaining the molar excess amount condition of the dicarboxylic acid in the reaction system, while increasing the productivity of the catalyst preparation process.

In another example, the entire reaction steps may be carried out while uniformly dripping the solution or dispersion containing the zinc precursor in droplets into the solution or dispersion containing the dicarboxylic acid.

The dicarboxylic acid may be added before or after heating, in the form of a slurry, by mixing with a powder or water. In addition, in order to increase the catalytic activity, a surfactant, a polyether, or the like may be further added to the reaction. Examples of the polyether include polyethylene glycol.

In the reaction step between the zinc precursor and the dicarboxylic acid, the reaction may be first carried out in a predetermined temperature range, and then the temperature may be raised to remove moisture generated during the synthesis. For example, after reacting at about 50 to 70° C. for about 3 to 5 hours, the temperature may be raised to about 100 to 140° C., and then the reaction may be further carried out for 3 to 5 hours. During the reaction, moisture generated during the synthesis may be removed using a Dean-Stark apparatus.

When the moisture is removed in the above process, the used solvent is recovered and the catalyst is washed several times with an organic solvent to remove unreacted dicarboxylic acid remaining in the catalyst.

The solvent recovered in the above-mentioned process and the organic solvent used for the washing of the catalyst can be reused after purification as needed.

The washed catalyst may be added directly into the polymerization reactor in the form of a powder after drying, or may be added into the polymerization reactor in the form of a slurry by mixing with a solvent.

Preparation of Monomer

The method of the present disclosure may further include a step of purifying the monomer before the polymerization step of the monomer. This is a step of preparing by purifying the epoxide compound, carbon dioxide, the solvent, and the like for use in the reaction by removing impurities, particularly moisture, contained therein. Excessive moisture may interfere with the polymerization of the organic zinc-based catalyst, thereby lowering the polymerization activity or obtaining a resin having a very low molecular weight. Therefore, purification of moisture plays an important role in high polymerization activity of the catalyst and control of the molecular weight.

In the present disclosure, a step of controlling the molecular weight by controlling the moisture content in the reaction mixture before the initiation of the polymerization to 10 to 1000 ppm may be further included. The present disclosure may prepare a polymer having a targeted molecular weight by controlling the moisture content of the raw material used in the reaction mixture.

Specifically, the carbon dioxide, the epoxide compound (preferably, an alkylene oxide compound), and the solvent used as raw materials are purified before polymerization, and then distilled water is artificially added thereto in a predetermined amount to adjust the moisture content in the reaction mixture before the initiation of the polymerization to 10 to 1000 ppm. In addition, in order to remove moisture, the raw materials may be passed through a column packed with a molecular sieve. Thus, the step of purifying the monomer may include a step of passing the monomer through a column packed with a molecular sieve and purifying the same to make the moisture content of the monomer of less than 10 ppm.

In addition, in using the organic zinc-based catalyst, the moisture content in the reaction mixture plays an important role in controlling the molecular weight of the polyalkylene carbonate resin. As the moisture content increases, the molecular weight of the resin decreases, while the lower the moisture content, the higher the molecular weight. Therefore, the moisture content can be artificially introduced or adjusted to meet the targeted molecular weight (target Mw) within the above-mentioned moisture content range.

In addition, the monomer used for the polymerization may be recovered/purified after the polymerization according to the process described later, and may be reused for the reaction.

Meanwhile, the epoxide compound used in the polymerization may be at least one selected from the group consisting of a C2 to C20 alkylene oxide substituted or unsubstituted with a halogen or a C1 to C5 alkyl group, a C4 to C20 cycloalkylene oxide substituted or unsubstituted with a halogen or a C1 to C5 alkyl group, and a C8 to C20 styrene oxide substituted or unsubstituted with a halogen or a C1 to C5 alkyl group. More preferably, the epoxide compound may include a C2 to C20 alkylene oxide substituted or unsubstituted with a halogen or a C1 to C5 alkyl group, Specific examples of the epoxide compound include ethylene oxide, propylene oxide, butene oxide, pentene oxide, hexene oxide, octene oxide, decene oxide, dodecene oxide, tetradecene oxide, hexadecene oxide, octadecene oxide, butadiene monoxide, 1,2-epoxy-7-octene, epifluorohydrin, epichlorohydrin, epibromohydrin, isopropyl glycidyl ether, butyl glycidyl ether, t-butyl glycidyl ether, 2-ethylhexyl glycidyl ether, allyl glycidyl ether, cyclopentene oxide, cyclohexene oxide, cyclooctene oxide, cyclododecene oxide, alpha-pinene oxide, 2,3-epoxy norbornene, limonene oxide, dieldrin, 2,3-epoxypropylbenzene, styrene oxide, phenylpropylene oxide, stilbene oxide, chlorostilbene oxide, dichlorostilbene oxide, 1,2-epoxy-3-phenoxypropane, benzyloxymethyloxirane, glycidyl-methylphenyl ether, chlorophenyl-2,3-epoxypropyl ether, epoxypropyl methoxyphenyl ether, biphenyl glycidyl ether, glycidyl naphthyl ether, and the like.

Preferably, ethylene oxide is used as the epoxide compound.

(a) The Polymerization Process

The polymerization step (a) includes a step of obtaining a polymerization solution containing a polyalkylene carbonate resin and reaction byproducts by copolymerizing carbon dioxide and an epoxide compound as monomers with a zinc-based catalyst and a solvent.

The polymerization method of the polyalkylene carbonate of the present disclosure may be carried out by batch or continuous polymerization, and may include solution polymerization.

The polymerization step according to a preferred embodiment of the present disclosure may include a step of feeding a catalyst, a solvent, an epoxide compound, and carbon dioxide into a polymerization reactor, followed by solution polymerization of the epoxide compound and the carbon dioxide in the presence of the catalyst and the solvent.

The polymerization step may be carried out in a molar ratio of the epoxide compound to the zinc-based catalyst of 50:1 to 400:1, a polymerization temperature of 50 to 90° C., and a polymerization pressure of 15 to 50 bar for 1 to 60 hours.

Specifically, in the present disclosure, the epoxide compound and the zinc-based catalyst may be used in a molar ratio of 50:1 to 400:1. If the molar ratio is less than 50:1, it may be difficult to achieve sufficient activity. If the molar ratio is more than 400:1, residual monomers may excessively remain, which may reduce the efficiency of the whole process.

Further, in the present disclosure, the polymerization temperature is controlled in a range of about 50 to 90° C. Since the content of the cyclic alkylene carbonate byproducts produced during the polymerization reaction is generally proportional to the polymerization temperature, the content of byproducts may be controlled according to the polymerization temperature. In other words, if the polymerization temperature is too high, the content of the alkylene carbonate byproducts increases, while if the polymerization temperature is too low, the activity of the catalyst becomes low, which is not preferable.

In addition, the polymerization pressure may be in the range of about 12 to 50 bar, preferably 15 to 50 bar. If the polymerization pressure is 12 bar or less, the content of the polyalkylene glycol (for example, PEG) in the byproducts tends to increase. Therefore, it is not preferable to proceed with the polymerization at a pressure of 12 bar or less. Further, if the polymerization pressure is 50 bar or more, it is necessary to prepare a high-pressure apparatus, excessively increasing the cost.

The carbon dioxide may be continuously or discontinuously introduced during the reaction. In this case, the polymerization reactor may be a continuous type, a semi-batch type, or a batch system. More preferably, the carbon dioxide is introduced continuously, because the carbon dioxide is consumed during the reaction and the reaction pressure decreases. If the carbon dioxide is not continuously introduced, production of byproducts such as polyethylene glycol may increase separately from the carbonate copolymerization reaction aimed at in the present disclosure. Further, the reaction pressure in the case of continuous introduction of carbon dioxide in the polymerization may be 12 to 50 bar, more preferably 15 to 40 bar.

The epoxide compound/carbon dioxide may be introduced in a molar ratio of 1:1 to 1:10. More preferably, the epoxide compound/carbon dioxide may be introduced in a molar ratio of 1:2 to 1:5. When the carbon dioxide is introduced within the above-mentioned ratio, the polymerization reactor may preferably be a continuous type of system or a semi-batch type of system.

In addition, the epoxide compound/solvent is preferably in a weight ratio of 1:0.1 to 1:50 in the polymerization, more preferably 1:0.5 to 1:10. If the amount of the solvent relative to the epoxide compound is too low, the viscosity may suddenly rise in the post-polymerization process, which may make the operation difficult. If the amount of the solvent relative to the epoxide compound is too high, the catalytic activity is lowered and the process operation cost is increased. The solvent may be methylene chloride, 1,2-dichloroethane, n-methyl pyrrolidone, dimethyl sulfoxide, 1,4-dioxane, 1,3-dioxolane, and the like, and preferably methylene chloride, 1,2-dichloroethane, or 1,3-dioxolane may be used.

When the polymerization is completed, the solid content in the reaction mixture may be diluted to about 5 to 20% depending on the molecular weight to lower the viscosity for transportation and post-treatment.

After the solution polymerization is completed, a reaction mixture which contains a polyalkylene carbonate, unreacted residual monomers, a catalyst residue, a solvent, and byproducts is prepared. The unreacted residual monomers include unreacted carbon dioxide and unreacted epoxide compound.

(b) The Monomer Recovery Process

Subsequently, the present disclosure carries out the step of recovering the unreacted residual monomers from the reaction mixture.

Preferably, the step (b) may include removing the unreacted residual monomers from the polymerization solution by using a venting method, a simple flash drum, a falling film evaporator, a thin film evaporator, or a combination thereof.

That is, the carbon dioxide among the carbon dioxide and the epoxide compound which are polymerization raw materials exists not only in the gas phase in the reactor but also in the state of being dissolved in the solution. Therefore, the unreacted carbon dioxide may be recovered from the polymerization solution by reducing the reaction pressure through venting or the like after completion of the polymerization. At this time, the unreacted epoxide compound and the solvent may be released together with the carbon dioxide, which can be separated from the carbon dioxide through an appropriate purification column. The obtained carbon dioxide may be re-introduced into the reactor through recompression using a compressor after carrying out water purification, if necessary.

After the unreacted carbon dioxide is recovered, the unreacted epoxide compound present in the polymerization solution is recovered.

Specifically, in the present disclosure, the polymer solution containing the reaction mixture is first distilled to remove most of the epoxide compound, and the removed epoxide compound is recovered together with the solvent. Second, the unreacted epoxide compound is additionally recovered with the solvent through a falling film evaporator or a thin film evaporator.

At this time, the concentration of the epoxide compound remaining in the polymer solution containing polyalkylene carbonate is preferably as low as possible, and is preferably maintained at 1% or less. If the concentration of the epoxide compound is high, the epoxide compound not only causes an additional reaction in a later process but also reduces the amount of recovered monomers, which is not preferable.

The epoxide compound recovered together with the solvent in the above process may be reused in the polymerization process after purification, if necessary, thereby contributing to cost reduction.

In addition, the content of residual epoxide compounds in the polymerization solution may be minimized by using an extraction column (e.g., a rotating disc contactor (RDC) column) or a multi-decanter. When the extraction column or the multi-decanter is used, most of the epoxide compounds remaining in the polymer solution can be removed by using water, and then the epoxide compound dissolved in the water is converted into the alkylene glycol. In addition, when the extraction column is used, part of the cyclic alkylene carbonate produced as a byproduct in the polymerization process may be removed.

(c) The Catalyst Removal and Recovery Process

The step (c) of removing the catalyst residue and recovering the raw materials of the catalyst includes a step of removing the catalyst residue from the polymerization solution from which unreacted monomers have been removed, and recovering the main raw materials of the catalyst. The main raw materials of the catalyst may include dicarboxylic acid.

Specifically, in the case of the heterogeneous organometallic catalyst used in the polyalkylene carbonate polymerization, when the metal component of the catalyst remains in the resin after the polymerization, decomposition and depolymerization of the resin occur through a back-biting reaction at a high temperature, or the like. In addition, the higher the reaction temperature and the catalyst content, the faster the decomposition and depolymerization rate. Therefore, in order to maximize the thermal stability of the resin, it is necessary to remove the metal component of the catalyst after polymerization.

According to a preferred embodiment of the present disclosure, the step of removing the catalyst includes removing the catalyst from the reaction mixture by an ion exchange method, a filtration method using a metal or polymer filter, a centrifuge method, or a combination thereof. In addition, it may include a step of recovering the raw materials of the catalyst by an ion exchange method after removing the catalyst.

That is, in the present disclosure, the catalyst used for the polymerization may be removed by a chemical catalyst removal method using the ion exchange method, or the catalyst may be removed by a combination of chemical and physical methods using a metal/polymer filter or a centrifuge. Then, the main raw materials of the catalyst may be recovered from the removed catalyst by using an ion exchange resin.

Preferably, the step (c) of removing the catalyst residue may include removing the catalyst residue from the polymerization solution by a method using an ion exchange resin, or a filtration method selected from the group consisting of a metal filter, a polymer filter, and a centrifuge.

Also, the step (c) of recovering raw materials of the catalyst may include removing the catalyst residue from the polymerization solution by using an ion exchange resin, precipitating the raw materials of the catalyst on the surface of the ion exchange resin, and recovering the raw materials of the catalyst by using water, or recovering the catalyst from the polymerization solution by using a metal filter, a polymer filter, or a centrifuge, passing through an ion exchange resin to precipitate the raw materials of the catalyst on the surface of the ion exchange resin, and recovering the raw materials of the catalyst by using water.

At this time, it may be preferable to use an acid ion exchange resin (IER) as the ion exchange method for efficiently removing the organometallic catalyst. The organometallic catalyst in the solvent chemically reacts with the acid ion exchange resin to cause ion-bonding of the metal component (zinc) of the catalyst with the ion exchange resin, and the dicarboxylate is converted to the dicarboxylic acid. The dicarboxylic acid, which is the main raw material of the catalyst, is not dissolved in the solvent used in the reaction, but is present in a solid state adsorbed on the surface of the ion exchange resin. Therefore, the dicarboxylic acid precipitated on the surface may be recovered by washing with water, and the recovered dicarboxylic acid may be used again as a raw material for preparing the organometallic catalyst.

Meanwhile, when a metal or polymer filter is used, the present disclosure may be carried out by passing the reaction mixture through a metal or polymer filter, or passing the reaction mixture in a direction parallel to the metal or polymer filter, and removing it by filtration. The catalyst filtered by the filter may be physically removed from the filter. The obtained catalyst is diluted in a solvent again, and then the metal is bonded to the ion exchange resin through the ion exchange resin in the manner described above, and the dicarboxylic acid precipitated on the surface may be recovered by washing with water.

In the case of using a centrifuge, the catalyst is separated from the polymerization solution due to the difference in the specific gravity between the catalyst and the polymerization solution, which may be operated as a continuous or batch type of process.

The removed catalyst may be further diluted with a solvent, and then passed through an ion exchange resin to recover the dicarboxylic acid in the same manner as described above.

(d) The Solution Blending Process

The step (d) of solution-blending may include the step of preparing a resin composition containing the polyalkylene carbonate by adding the thermostable blending resin dissolved in the solvent into the polymerization solution containing the polyalkylene carbonate by using a stirrer mixer, a tank reactor, or an extruder to make the weight ratio of the polyalkylene carbonate to the thermostable blending resin be 99:1 to 10:90 (based on resin), and then solution-blending.

The step (d) of solution-blending may include a step of blending in a solution state after introducing the thermostable blending resin having compatibility with the polyalkylene carbonate and soluble in the solvent used in the polymerization directly into the polymerization solution containing the polyalkylene carbonate in which the catalyst residue has been removed in accordance with the targeted weight ratio, or first dissolving the thermostable blending resin in the solvent, and then introducing it into the polymerization solution containing the polyalkylene carbonate.

Specifically, the polyalkylene carbonate is particularly vulnerable to heat and is easily decomposed at a high temperature, which is a major obstacle to the preparation process of the polyalkylene carbonate or to the development of processing and application. In addition, the polyalkylene carbonate has no crystallinity and has a low glass transition temperature (Tg), causing adhesion between resins at room temperature. Moreover, the polyalkylene carbonate not only has a narrow range of the processing temperature due to its low thermal stability, but is also difficult to compound with other resins at a high temperature such as through extrusion, and there is adhesion between resins. Therefore, there are difficulties in transfer and storage of the final pellet product.

Therefore, the present disclosure may carry out the solution-blending as a method of solving these problems and improving the thermal stability of the polyalkylene carbonate, which can minimize the decomposition in the process and widen the range of the processing temperature, thereby improving the processability and solving the problem of adhesion between the pellets of the final product.

According to a preferred embodiment of the present disclosure, in order to improve the thermal stability and processability of the polyalkylene carbonate obtained by the synthesis after the step of removing the catalyst, the blending resin, which is compatible with the polyalkylene carbonate and is soluble in the solvent used in the polymerization among the resin having excellent thermal stability and a higher glass transition temperature than the polyalkylene carbonate, is selected, and directly introduced in accordance with the targeted weight ratio or first dissolved in the polymerization solvent and then solution-blended (mixed) with the polymerization solution containing the polyalkylene carbonate in which the catalyst residue has been removed. The resin composition containing the polyalkylene carbonate can be prepared by the above solution-blending. The solution-blending may be performed by using a device commonly used for blending between high viscosity solutions, such as a static mixer, tank-type equipment with an impeller, an extruder, and the like.

In particular, the present disclosure not only maximizes compatibility between resins by solution-blending the polymerization solution containing the polyalkylene carbonate with the solution containing the blending resin having thermal stability in a liquid state at a low temperature where the polyalkylene carbonate is stable, but also maximizes the thermal stability at a high temperature required in the solvent recovery process and the byproduct removal process.

The blending resin may be a resin that dissolves in the solvent used in the polymerization, and may be at least one selected from the group consisting of polylactide, polymethyl methacrylate, and cellulose acetate.

The polyalkylene carbonate and the thermostable blending resin may be solution-blended in a weight ratio of 99:1 to 10:90. Preferably, the polyalkylene carbonate and the thermostable blending resin may be solution-blended in a weight ratio of 97:3 to 20:80.

If the thermostable blending resin is contained in an amount of less than about 1 part by weight, it is impossible to have the above-mentioned excellent thermal stability which can be achieved by the inclusion of the thermostable resin, and physical and mechanical properties as well as the blocking phenomenon cannot be expected to be improved.

If the thermostable blending resin exceeds about 90 parts by weight, gas barrier properties and elongation may be lowered, and transparency may be deteriorated.

(e) The Solvent Recovery Process

The step (e) of recovering the solvent includes a step of recovering the solvent from the polymerization solution obtained in the solution-blending process by a process using a stirring mixer, an evaporator or an extruder, or a kneader-type devolatilizer.

This is a process in which most of the solvent is removed by volatilization from the reaction mixture obtained after solution-blending, and the volatilized solvent is recovered by condensation. After the process is performed, a considerable amount of the solvent contained in the reaction mixture is removed.

As the solvent is removed, the viscosity of the polymerization solution sharply increases, and the volatilization efficiency may be sharply lowered. Therefore, different types of devices may be used depending on the viscosity-based sections such as a low-viscosity section and a high-viscosity section. For example, the step of recovering the solvent may be carried out by using a device selected from the group consisting of a simple flash drum, a falling film evaporator, a thin film evaporator, an extrusion devolatilizer, a kneader-type devolatilizer, and a Filmtruder. Since the solvent recovery devices are well known in the art, a detailed description thereof will be omitted.

According to a preferred embodiment of the present disclosure, the step of recovering the solvent may include removing the solvent in a content of at least 60 wt %, preferably at least 90 wt %, more preferably at least 95 wt % in the polymerization solution by volatilizing the solvent while extruding or kneading the polymerization solution by using a twin-screw extrusion devolatilizer or a kneader-type devolatilizer at a extrusion temperature of 40° C. to 150° C. and at atmospheric pressure to a vacuum.

More preferably, the extrusion-devolatilization process may remove the solvent from the reaction mixture under the conditions that the number of revolutions of the main screw of the twin-screw extruder is 50 to 500 rpm, the temperature of the screw zone is 40 to 150° C., and the temperature of the product (polymer) in the reaction mixture is 40° C. to 150° C.

According to this method, the volatility of the solvent may be improved by using a high viscosity mixer capable of stirring, and the volatility of the solvent may be further improved by performing at a temperature higher than room temperature.

The solvent recovered in the above-mentioned process may be used, as needed, for controlling the viscosity of the polymer solution in the process, or may be reused in the slurry preparation or polymerization process of the catalyst after purification.

(f) The Byproduct Removal Process

The step (f) of removing the byproducts includes a step of finally removing the solvent from the polymerization solution from which a significant amount of the solvent obtained from the solvent recovery process is removed, and at the same time, removing the cyclic alkylene carbonate as a byproduct by using an extrusion or kneader-type devolatilizer.

Part of the reaction byproducts is formed in the mechanism of copolymerizing the polyalkylene carbonate resin from the carbon dioxide and the epoxide compound using the organic zinc catalyst. In addition, the byproducts may also be generated during decomposition of the polyalkylene carbonate by chain scission and backbiting due to the catalyst and heat.

If the byproducts remain in the resin at over a certain amount, the glass transition temperature is lowered and the mechanical properties and gas barrier performance are lowered, which adversely affects the resin properties. Therefore, it is preferable that the content of the cyclic alkylene carbonate in the resin is appropriately controlled by removing the byproducts in the polyalkylene carbonate production process. Such byproducts may include alkylene carbonates having 1 to 5 carbon atoms, for example, ethylene carbonate.

Therefore, a process for economically removing the byproducts is required. In the present disclosure, the byproducts present in the reaction mixture are removed using an extrusion devolatilization process or a kneader devolatilization process under a high temperature and a high vacuum. In addition, since the solvent remaining in the product may be further removed through the above process to such an extent that the solvent cannot be detected, the quality of the final product can be further increased.

In addition, the process may use a twin-screw extrusion devolatilizer or a kneader-type devolatilizer.

According to a preferred embodiment of the present disclosure, the step of removing the byproducts includes a step of removing the byproducts and the remaining solvent at the same time by extruding or kneading the polymerization solution at a high temperature and a high vacuum using a twin-screw extrusion devolatilizer or a kneader-type devolatilizer at a extrusion temperature of 120° C. to 200° C. and a degree of vacuum of 1 Torr to 500 Torr, preferably 1 Torr to 300 Torr, and more preferably 1 Torr to 150 Torr.

In a more preferred example, the extrusion-devolatilization process may remove the byproducts and the solvent from the reaction mixture by extrusion using a die under the conditions that the number of revolutions of the main screw of the twin-screw extruder is 10 to 200 rpm, the temperature of the screw zone is 120 to 200° C., the temperature of the product (polymer) in the reaction mixture is 120 to 200° C., and the degree of vacuum is 1 Torr to 150 Torr.

(g) The Compounding and Pelletizing Process

The present disclosure may further include a step of forming a resin composition containing the polyalkylene carbonate, and then pelletizing, drying, and packaging the resin composition. It may further include additional volatilization and compounding processes, if necessary, before and after pelletizing.

Preferably, after the step (f) of removing the byproducts, the method of the present disclosure may further include a step (g) of obtaining the resin composition containing the polyalkylene carbonate in the form of pellets through a pelletizing process and a drying process of the resin composition containing the polyalkylene carbonate in which byproducts were removed. In addition, before or after the step of obtaining the resin composition containing the polyalkylene carbonate in the form of pellets, a step of compounding and pelletizing the pelletized resin composition containing the polyalkylene carbonate and the thermostable compounding resin may be further included.

Herein, the thermostable compounding resin may be at least one selected from the group consisting of polylactide, polymethyl methacrylate, cellulose acetate, polyoxymethylene, polyketone, and polyamide.

In this process, the polymer from which the solvent and unreacted byproducts have been removed is obtained in the form of strands using the extruder. Then, the polymer is hardened by using low-temperature water and then cut into pellets using a cutter, followed by the drying process to remove water on the surface of the pellets.

In addition, the compounding method referred to in the present disclosure may include a molding process such as pelletization for the polyalkylene carbonate, and the molding process may be carried out after mixing one or more additional resins.

Specifically, the pelletizing step is the step of processing the resin composition containing the polyalkylene carbonate (PEC) which is finally obtained after removing the unreacted monomers ($CO_2$, EO), the catalyst, the solvent, and the byproducts (EC) from the polymerization solution.

In the present disclosure, various known methods may be used as the product molding method. Examples of the method for obtaining a homogeneous mixture include a method of mixing by using a Henschel mixer, a ribbon blender, a blender, or the like. As the melt kneading method, a Banbury mixer (VAN Antonie Louis Barye mixer), a single-screw or twin-screw compressor, or the like may be used. The shape of the resin composition of the present disclosure is not particularly limited, and may be, for example, a strand, a sheet, a flat plate, a pellet, or the like.

The method of molding the resin composition to obtain a molded article may be carried out by a known method such as injection molding, compression molding, injection compression molding, gas injection molding, foam injection molding, inflation, T-die molding, a calendar method, a blow molding method, vacuum forming, and pressure forming.

Preferably, in the present disclosure, pelletization is carried out using extrusion molding. Such a pelletizing process includes a step of introducing the reaction mixture into a twin-screw extruder to make it into a pellet form. Further, as described above, in the pelletizing process, it is preferable to produce pellets having a size of 1 mm to 5 mm.

The pelletizing process according to the present disclosure may be underwater pelletizing or strand pelletizing, and the additives may be added into the extruder for forming pellets to improve the physical properties of the resin.

Further, in order to prevent adhesion between the pellets in the pelletization step, a step of adding at least one additive selected from the group consisting of silica, calcium carbonate, cellulose, ethylene bis(stearamide) (EBS), and a polymer powder may be further included.

In addition, when the compounding step is further carried out after the pelletizing step, a step of adding at least one additive selected from the group consisting of silica, calcium carbonate, cellulose, and a polymer powder during or after compounding may be further included.

Herein, the compounding resin may be the same materials as described above. For example, the compounding resin may be at least one selected from the group consisting of polylactide, polymethyl methacrylate, cellulose acetate, polyoxymethylene, polyketone, and polyamide.

In addition, the pelletized resin composition containing the polyalkylene carbonate and the thermostable compounding resin may be compounded in a weight ratio of 99:1 to 10:90, and preferably 97:3 to 20:80.

After the pelletizing and drying steps, the present disclosure may further include a storage and packaging step.

For example, the pellets obtained through the above process are dried, and then stored in a silo or packed and stored in a bag, then shipped.

The final resin composition of the present disclosure may have a metal content of the catalyst of less than 300 ppm, a solvent content of less than 0.5 wt %, and a content of the cyclic alkylene carbonate byproduct of less than 2 wt %.

More preferably, according to the present disclosure, the metal content of the catalyst may be 1 to 200 ppm, and the solvent content may be 0.2 wt % or less.

At this time, it is preferable that the polyalkylene carbonate may be polyethylene carbonate.

Hereinafter, preferred examples of the present invention will be described in detail. However, these examples are for illustrative purposes only, and the scope of the present invention is not intended to be limited by these examples.

Preparation Example: Preparation of Organic Zinc Catalyst (Molar Ratio of Glutaric Acid:ZnO=1:1)

In a 160 L reactor, 11.9 kg (189.3 mol) of glutaric acid was dispersed in 100 L of toluene under reflux and heated at 55° C. for 30 minutes.

Separately, 7.3 kg (190 mol) of ZnO was added to 30 L of toluene and stirred to prepare a ZnO dispersion.

The ZnO dispersion was divided into quarters based on the volume, and one quarter of the dispersion was added to the glutaric acid solution to carry out the reaction. After one hour, another quarter of the ZnO dispersion was added to carry out the reaction, and one hour later, another quarter of the ZnO dispersion was added to carry out the reaction. After one hour, the last quarter of the ZnO dispersion was added to carry out the reaction. The reaction mixture was reacted at 55° C., raised to 110° C., and heated for 3 hours to remove water generated during the synthesis by using a Dean-Stark apparatus. After a white solid was formed, it was filtered, washed with acetone/ethanol, and dried in a vacuum oven at 130° C.

The organic zinc catalyst (Zn-based catalyst) was prepared by this method.

Experimental Example: Analysis of Physical Properties of Polymerized PEC

In order to compare the physical properties of the samples prepared in examples and comparative examples, the molecular weight was measured and composition analysis was performed on each PEC.

The molecular weight and molecular weight distribution were measured using gel permeation chromatography (GPC). The samples were dissolved in chloroform ($CHCl_3$), filtered through a 0.45 um syringe filter, injected into the device, and then measured using a Polymer Lab mixed C&C column and a refractive index detector (RI detector, Waters 2414 RI). Herein, a polystyrene sample was used as a standard.

The composition analysis of the samples was performed by $^1$H NMR using a Varian Unity Inova 500 MHz nuclear resonance spectrometer (Varian).

Example 1: Change in Molecular Weight and Selectivity of Polyalkylene Carbonate According to Moisture Content Before the polymerization, carbon dioxide, ethylene oxide, and methylene chloride (hereinafter, $CO_2$, EO, and MC) were sufficiently purified using a molecular sieve. After that, in order to control the molecular weight, distilled water was artificially introduced into MC to adjust the moisture content thereof to 21 ppm, and it was used for polymerization.

Then, a raw material feed tank, a polymerization reactor, an agitated flash drum and a twin-screw extruder for recovering the solvent, a twin-screw extruder for removing byproducts, an extruder for pelletizing, a centrifugal dryer, and a pellet recovery device were connected to each other and used in the method of preparing a resin composition containing a polyethylene carbonate.

First, a 1 $m^3$ autoclave reactor equipped with a stirrer was used as the polymerization reactor. Then, the zinc-based catalyst obtained in the preparation example, MC, EO, and carbon dioxide were fed to the polymerization reactor through the raw material feed tank, and solution polymerization was carried out under the conditions shown in Table 1 to prepare a polyethylene carbonate.

After completion of the solution polymerization under the above conditions, unreacted carbon dioxide and ethylene oxide were removed by venting and sufficiently diluted, and most of the residual ethylene oxide was further removed by using an RDC column. Then, the catalyst was removed using an acid ion exchange resin, and the surface of the ion exchange resin was washed with water to recover glutaric acid as a raw material of the catalyst.

At this time, the obtained polyalkylene carbonate resin (i.e., PEC) had a weight average molecular weight of 404 kg/mol and showed selectivity of 95%.

Example 2: Change in Molecular Weight and Selectivity of Polyalkylene Carbonate According to Moisture Content Before the polymerization, $CO_2$, EO, and MC were sufficiently purified. After that, distilled water was artificially added so that the moisture content of MC was 68 ppm, and the polymerization proceeded. The same method as in Example 1 was used, and the amounts of the catalyst, $CO_2$, EO, and MC were as shown in Table 1. Herein, a change in the ratio of the catalyst, the monomer, and MC was ignored since it does not affect the molecular weight and selectivity of the polyalkylene carbonate. (Comparative Example 2)

At this time, the obtained polyalkylene carbonate resin (i.e., PEC) had a weight average molecular weight of 240 kg/mol and showed selectivity of 93%.

Example 3: Change in Molecular Weight and Selectivity of Polyalkylene Carbonate According to Moisture Content Before the polymerization, $CO_2$, EO, and MC were sufficiently purified. After that, distilled water was artificially added so that the moisture content of MC was 103 ppm, and the polymerization proceeded. The same method as in Example 1 was used, and the amounts of the catalyst, $CO_2$, EO, and MC were as shown in Table 1. Herein, a change in the ratio of the catalyst, the monomer, and MC was ignored since it does not affect the molecular weight and selectivity of the polyalkylene carbonate. (Comparative Example 2)

At this time, the obtained polyalkylene carbonate resin (i.e., PEC) had a weight average molecular weight of 192 kg/mol and showed selectivity of 93%.

Example 4: Change in Molecular Weight and Selectivity of Polyalkylene Carbonate According to Moisture Content Before the polymerization, $CO_2$, EO, and MC were sufficiently purified. After that, distilled water was artificially added so that the moisture content of MC was 129 ppm, and the polymerization proceeded. The same method as in Example 1 was used, and the amounts of the catalyst, $CO_2$, EO, and MC were as shown in Table 1. Herein, a change in the ratio of the catalyst, the monomer, and MC was ignored since it does not affect the molecular weight and selectivity of the polyalkylene carbonate. (Comparative Example 2)

At this time, the obtained polyalkylene carbonate resin (i.e., PEC) had a weight average molecular weight of 158 kg/mol and showed selectivity of 93%.

Example 5: Change in Molecular Weight and Selectivity of Polyalkylene Carbonate According to Moisture Content Before the polymerization, $CO_2$, EO, and MC were sufficiently purified. After that, distilled water was artificially added so that the moisture content of MC was 234 ppm, and the polymerization proceeded. The same method as in Example 1 was used, and the amounts of the catalyst, $CO_2$, EO, and MC were as shown in Table 1. Herein, a change in the ratio of the catalyst, the monomer, and MC was ignored since it does not affect the molecular weight and selectivity of the polyalkylene carbonate. (Comparative Example 2)

At this time, the obtained polyalkylene carbonate resin (i.e., PEC) had a weight average molecular weight of 135 kg/mol and showed selectivity of 92%.

Example 6: Removal of Catalyst Using a Centrifuge

Before the polymerization, carbon dioxide, ethylene oxide, and methylene chloride (hereinafter, $CO_2$, EO, and MC) were sufficiently purified using a molecular sieve. Then, 2 kg of the zinc-based catalyst obtained in the preparation example, 462 kg of MC, and 47 kg of EO were fed to the polymerization reactor through the raw material feed tank, and solution polymerization was carried out in the same manner as in Example 1 under the conditions of a polymerization temperature of 70° C. and a polymerization pressure of 30 bar.

After completion of the solution polymerization under the above conditions, unreacted carbon dioxide and ethylene oxide were removed by venting, and a sufficient amount of MC was added to reduce the viscosity to about 200 cP. Subsequently, a part of the prepared polyalkylene carbonate polymerization solution was centrifuged for 60 seconds with centrifugal force of 15,000 G using a tubular type (2 L) centrifuge using a tubular rotating bowl.

At this time, the Zn content of the centrifuged polyalkylene carbonate polymerization solution (i.e., PEC polymerization solution) was 6600 ppm, and the removal efficiency was about 49% as compared with Comparative Example 4.

Example 7: Removal of Catalyst Using a Centrifuge

A part of the polyalkylene carbonate polymerization solution prepared using the same method and conditions as in Example 6 was centrifuged for 80 seconds using the same centrifuge.

At this time, the Zn content of the centrifuged polyalkylene carbonate polymerization solution (i.e., PEC polymerization solution) was 4600 ppm, and the removal efficiency was about 65% as compared with Comparative Example 4.

Example 8: Removal of Catalyst Using a Centrifuge

A part of the polyalkylene carbonate polymerization solution prepared using the same method and conditions as in Example 6 was centrifuged for 200 seconds using the same centrifuge.

At this time, the Zn content of the centrifuged polyalkylene carbonate polymerization solution (i.e., PEC polymerization solution) was 1700 ppm, and the removal efficiency was about 87% as compared with Comparative Example 4.

Example 9: Removal of Catalyst Using an Ion Exchange Resin

Before the polymerization, carbon dioxide, ethylene oxide, and methylene chloride (hereinafter, $CO_2$, EO, and MC) were sufficiently purified using a molecular sieve. Then, 1.5 kg of the zinc-based catalyst obtained in the preparation example, 300 kg of MC, and 100 kg of EO were fed to the polymerization reactor through the raw material feed tank, and solution polymerization was carried out in the same manner as in Example 1 under the conditions of a polymerization temperature of 70° C. and a polymerization pressure of 30 bar.

After completion of the solution polymerization under the above conditions, unreacted carbon dioxide and ethylene oxide were removed by venting, and a sufficient amount of MC was added to reduce the viscosity to about 200 cP. Thereafter, the catalyst residue contained in the polyalkylene carbonate polymerization solution was removed by using an ion exchange resin.

First, two ion exchange resin columns (0.125 m$^3$) connected in series were filled with an ion exchange resin, and the prepared polyalkylene carbonate polymerization solution was transferred using a centrifugal pump at a flow rate of 50 to 250 kg/h. After two cycles of the circulation, some samples were taken and dried for zinc content determination.

At this time, the Zn content of the obtained polyalkylene carbonate polymer (i.e., PEC) was 59 ppm.

Example 10: Removal of Catalyst Using an Ion Exchange Resin

The experiment was carried out in the same manner as in Example 9, except that the ion exchange resin column circulation of the polymerization solution was carried out five times.

At this time, the Zn content of the obtained polyalkylene carbonate polymer (i.e., PEC) was 32 ppm.

Example 11: Removal of Catalyst Using a Polymer Filter

The catalyst residue contained in the polyalkylene carbonate polymerization solution prepared using the same method as in Example 9 was removed using a polymer filter.

First, fifteen polymer filters (ENSFIL EQ series, S&S Filtech Co., Ltd) having a pore size of 0.5 μm and a size of ø68*750H were installed in a filter housing, and then the polyalkylene carbonate polymerization solution was passed through using a centrifugal pump at a flow rate of 250 kg/h.

At this time, the Zn content of the filtered polyalkylene carbonate polymer (i.e., PEC) was 35 ppm.

Example 12: Thermal Stability of Polyalkylene Carbonate Resin Composition Containing Polylactide Before the polymerization, carbon dioxide, ethylene oxide, and methylene chloride (hereinafter, $CO_2$, EO, and MC) were sufficiently purified using a molecular sieve. After that, in order to control the molecular weight, distilled water was artificially introduced into MC to adjust the moisture content of MC to 70 ppm, and it was used for polymerization.

Then, a raw material feed tank, a polymerization reactor, an agitated flash drum and a twin-screw extruder for recovering the solvent, a twin-screw extruder for removing byproducts, an extruder for pelletizing, a centrifugal dryer, and a pellet recovery device were connected to each other and used in the method of preparing a resin composition containing a polyethylene carbonate.

First, a 1 m$^3$ autoclave reactor equipped with a stirrer was used as the polymerization reactor. Then, the zinc-based catalyst obtained in the preparation example, MC, EO, and carbon dioxide were fed to the polymerization reactor through the raw material feed tank, and solution polymerization was carried out under the conditions shown in Table 2 to prepare a polyethylene carbonate.

After the solution polymerization, unreacted carbon dioxide and ethylene oxide were removed by venting and sufficiently diluted, and most of the residual ethylene oxide was further removed by using an RDC column. Then, the catalyst was removed using an acid ion exchange resin, and the surface of the ion exchange resin was washed with water to recover glutaric acid as a raw material of the catalyst.

Thereafter, for solution-blending with the polylactide (PLA), about 7 wt % (7.3 wt %) of PLA (molecular weight: 100 to 150 kg/mol, manufactured by NatureWorks) based on the polyalkylene carbonate was dissolved in MC and added to the polyalkylene carbonate polymerization solution, followed by sufficient stirring.

Thereafter, MC was volatilized and sequentially the extrusion using a die was performed at the same time under the conditions that the number of revolutions of the main screw (ø40) of the twin-screw extruder (L/D=60) was 100 rpm, the temperature of the twelve screw zones was 80 to 140° C., and the temperature of the die hole was 170° C.

The extruded polyalkylene carbonate (i.e., PEC) was pelletized to a size of 2-5 mm and then fully dried in a centrifugal dryer, and recovered using a pellet recovery device.

At this time, the EC content of the prepared polyalkylene carbonate resin composition was 0.78 wt % and 0.75 wt % before and after extrusion, respectively. From the above results, it was confirmed that there was no change in the content of the cyclic alkylene carbonate before and after extrusion, which shows that the polyalkylene carbonate resin composition containing the polylactide had improved thermal stability.

Example 13: Thermal Stability of Polyalkylene Carbonate Resin Composition Containing Polylactide The polyalkylene carbonate resin composition containing the polylactide was prepared using the same method and conditions as in Example 12, except that the polylactide content was adjusted to about 3 wt % (3.4 wt %).

At this time, the EC content of the polyalkylene carbonate resin composition was 1.28 wt % and 1.38 wt % before and after extrusion, respectively. From the above results, it was confirmed that there was no change in the content of the cyclic alkylene carbonate before and after extrusion, which shows that the polyalkylene carbonate resin composition containing the polylactide had improved thermal stability.

Example 14: Removal of Byproducts and Measurement of Thermal Stability of Polyalkylene Carbonate Resin Composition Using High Temperature and High Vacuum A polyalkylene carbonate (i.e., PEC) pellet having a molecular weight of 111 kg/mol and an EC content of 6.6 wt % was compounded with 10 wt % of a polylactide (PLA, molecular weight: 100 to 150 kg/mol, manufactured by NatureWorks) to prepare a polyalkylene carbonate resin composition containing a polylactide having a molecular weight of 73 kg/mol and an EC content of 3.02 wt %. Then, the pellet was used to measure removal efficiency of byproducts and thermal stability under high temperature and high vacuum conditions.

The cyclic alkylene carbonate, that is, the ethylene carbonate (EC), was volatilized and sequentially the polyalkylene carbonate (i.e., PEC) pellet containing the polylactide was extruded using a die at the same time under the conditions that the number of revolutions of the main screw (ø25) of the twin-screw extruder (L/D=60) was 67 rpm, the temperature of the sixteen screws zone was 80 to 200° C., the temperature of the die hole was 200° C., and the degree of vacuum was 4 Torr.

The extruded polyalkylene carbonate resin composition was pelletized to a size of 2-5 mm and then fully dried in a centrifugal dryer, and recovered using a pellet recovery device.

At this time, the extruded polyalkylene carbonate resin composition had a molecular weight of 75 kg/mol and an EC content of 1.15 wt %. From the above results, it was confirmed that the polyalkylene carbonate containing the polylactide was not thermally decomposed at a high temperature due to high thermal stability, and at the same time, the cyclic alkylene carbonate as a byproduct was also effectively removed.

Example 15: Removal of Byproducts and Measurement of Thermal Stability of Polyalkylene Carbonate Resin Composition Using High Temperature and High Vacuum The experiment was carried out in the same manner as in Example 14, except that the polylactide content was increased to 30 wt %. The polyalkylene carbonate resin composition containing the polylactide had a molecular weight of 83 kg/mol and an EC content of 2.06 wt %.

At this time, the extruded polyalkylene carbonate resin composition had a molecular weight of 78 kg/mol and an EC content of 0.85 wt %. From the above results, it was confirmed that the polyalkylene carbonate containing the polylactide was not thermally decomposed at a high temperature due to high thermal stability, and at the same time, the cyclic alkylene carbonate as a byproduct was also effectively removed.

Example 16: Polymerization of Polyalkylene Carbonate Using 1,3-Dioxolane

A polyethylene carbonate was polymerized and prepared by the following method using the ZnGA catalyst prepared in the preparation example. First, 1,3-dioxolane and ethylene oxide (EO) to be used for polymerization were sufficiently purified using a molecular sieve, and the moisture content of the reaction mixture before the reaction was adjusted to 15 ppm or less. Subsequently, in a glove box, the ZnGA catalyst prepared in 0.2 g (change in substrate weight before and after the catalyst synthesis reaction) of the preparation example, 8.5 g of dichloromethane (MC), and 8.5 g of ethylene oxide (EO) were added into an autoclave reactor equipped with a stirrer. Thereafter, carbon dioxide ($CO_2$) was introduced into the reactor, and the mixture was subjected to solution polymerization while being pressurized to 30 bar. The reaction was carried out at 70° C. for 3 hours. After completion of the reaction, unreacted $CO_2$, EO, and MC were removed by venting. Thereafter, the product was dried to obtain a polyethylene carbonate.

At this time, 6.5 g of the polyalkylene carbonate (i.e., PEC) was obtained. The weight average molecular weight of the prepared resin was 560 kg/mol, and the selectivity was 92%.

Comparative Example 1: Preparation of Polyalkylene Carbonate Using a Reaction Mixture Sufficiently Purified of Water After purification using a molecular sieve, the polymerization was carried out with the moisture content of MC of 5 ppm without further addition of water.

The same method as in Example 1-5 was used, and the amounts of the catalyst, $CO_2$, EO, and MC were as shown in Table 1. Herein, change in the ratio of the catalyst, the monomer, and MC different from Example 1-5 was ignored since it does not affect the molecular weight and selectivity of the polyalkylene carbonate. (Comparative Example 2)

At this time, the prepared polyalkylene carbonate resin (i.e., PEC) had a weight average molecular weight of 653 kg/mol and showed selectivity of 95%.

Comparative Example 2: Change in Molecular Weight and Selectivity of Polyalkylene Carbonate According to Change in Reaction Mixture Ratio After purification using a molecular sieve, the polymerization was carried out with the moisture content of MC of 7 ppm without further addition of water.

The same method as in Comparative Example 1 was used, and the amounts of the catalyst, $CO_2$, EO, and MC were as shown in Table 2.

At this time, the prepared polyalkylene carbonate resin (i.e., PEC) had a weight average molecular weight of 616 kg/mol and showed selectivity of 92%.

Comparative Example 3: Change in Molecular Weight and Selectivity of Polyalkylene Carbonate According to Change in Polymerization Temperature and Pressure After purification using a molecular sieve, the polymerization was carried out with the moisture content of MC of 5 ppm without further addition of water.

The same method as in Comparative Example 1 was used, but a polymerization pressure of 35 bar and a polymerization temperature of 85° C. were maintained in the polymerization reaction. The amounts of the catalyst, $CO_2$, EO, and MC were as shown in Table 2. Herein, change in the ratio of the catalyst, the monomer, and MC was ignored since it does not affect the molecular weight and selectivity of the polyalkylene carbonate. (Comparative Example 2)

At this time, the prepared polyalkylene carbonate resin (i.e., PEC) had a weight average molecular weight of 660 kg/mol and showed selectivity of 91%.

Comparative Example 4: Polymerization of Polyalkylene Carbonate Using an Organic Zinc Catalyst Before the polymerization, carbon dioxide, ethylene oxide, and methylene chloride (hereinafter, $CO_2$, EO, and MC) were sufficiently purified using a molecular sieve. Then, 2 kg of the zinc-based catalyst obtained in the preparation example, 462 kg of MC, and 47 kg of EO were fed to the polymerization reactor through the raw material feed tank, and polymerization was carried out in the same manner as in Example 1 under the conditions of a polymerization temperature of 70° C. and a polymerization pressure of 30 bar.

After completion of the solution polymerization under the above conditions, unreacted carbon dioxide and ethylene oxide were removed by venting, and a sufficient amount of MC was added to reduce the viscosity to about 200 cP. Thereafter, some samples were taken and dried for zinc content determination.

At this time, the Zn content of the obtained polyalkylene carbonate polymer (i.e., PEC) was 13,000 ppm.

Comparative Example 5: Removal of Catalyst Using an Ion Exchange Resin

Before the polymerization, carbon dioxide, ethylene oxide, and methylene chloride (hereinafter, $CO_2$, EO, and MC) were sufficiently purified using a molecular sieve. Then, 1.5 kg of the zinc-based catalyst obtained in the preparation example, 300 kg of MC, and 100 kg of EO were fed to the polymerization reactor through the raw material feed tank, and polymerization was carried out in the same manner as in Example 1 under the conditions of a polymerization temperature of 70° C. and a polymerization pressure of 30 bar.

After completion of the solution polymerization under the above conditions, unreacted carbon dioxide and ethylene oxide were removed by venting, and a sufficient amount of MC was added to reduce the viscosity to about 200 cP. Then, the catalyst was removed by a conventional method using a cationic ion exchange resin. Thereafter, some samples were taken and dried for zinc content determination.

At this time, the Zn content of the obtained polyalkylene carbonate polymer (i.e., PEC) was 5423 ppm.

Comparative Example 6: Thermal Stability of Polyalkylene Carbonate

Before the polymerization, $CO_2$, EO, and MC were sufficiently purified. After that, distilled water was artificially added so that the moisture content of MC was 70 ppm, and the polymerization proceeded. The same method as in Example 1 was used, and the amounts of the catalyst, $CO_2$, EO, and MC were as shown in Table 2.

After completion of the solution polymerization, unreacted carbon dioxide and ethylene oxide were removed by venting and sufficiently diluted, and most of the residual ethylene oxide was further removed by using an RDC column. Then, the catalyst was removed using an acid ion exchange resin, and the surface of the ion exchange resin was washed with water to recover glutaric acid as a raw material of the catalyst.

Thereafter, MC was volatilized and sequentially the extrusion using a die was performed at the same time under the conditions that the number of revolutions of the main screw (ø40) of the twin-screw extruder (L/D=60) was 100 rpm, the temperature of the twelve screw zones was 80 to 120° C., and the temperature of the die hole was 165° C.

The extruded polyalkylene carbonate was pelletized to a size of 2-5 mm and then fully dried in a centrifugal dryer, and recovered using a pellet recovery device.

At this time, the EC content of the extruded polyalkylene carbonate resin (i.e., PEC) was 0.59 wt % and 8.67 wt % before and after extrusion, respectively. From the above results, it was confirmed that an additional cyclic alkylene carbonate was produced since the polyalkylene carbonate was thermally decomposed due to low thermal stability.

Comparative Example 7: Removal of Byproducts and Measurement of Thermal Stability of Polyalkylene Carbonate Using High Temperature and Vacuum A polyalkylene carbonate pellet having a molecular weight of 111 kg/mol and an EC content of 6.64 wt % was used to measure removal efficiency of byproducts and thermal stability under high temperature and high vacuum conditions.

The cyclic alkylene carbonate, that is, the ethylene carbonate (EC), was volatilized and at the same time the polyalkylene carbonate pellet was extruded using a die under the conditions that the number of revolutions of the main screw (ø25) of the twin-screw extruder (L/D=60) was 67 rpm, the temperature of the sixteen screws zone was 80 to 170° C., the temperature of the die hole was 170° C., and the degree of vacuum was 6 Torr.

The extruded polyalkylene carbonate (i.e., PEC) was pelletized to a size of 2-5 mm and then fully dried in a centrifugal dryer, and recovered using a pellet recovery device.

At this time, the extruded polyalkylene carbonate resin composition had a molecular weight of 85 kg/mol and an EC content of 11.34 wt %. From the above results, it was confirmed that the content of the cyclic alkylene carbonate was increased since the polyalkylene carbonate was thermally decomposed due to low thermal stability.

Comparative Example 8: Removal of Byproducts and Measurement of Thermal Stability of Polyalkylene Carbonate Using High Temperature and Vacuum The experiment was carried out in the same manner as in Comparative Example 7 except that the temperature of the screw zone was 80 to 200° C., the temperature of the die hole was 200° C., and the degree of vacuum was 5 Torr.

At this time, the extruded polyalkylene carbonate resin composition had a molecular weight of 62 kg/mol and an EC content of 19.76 wt %. From the above results, it was confirmed that the content of the cyclic alkylene carbonate was increased since the polyalkylene carbonate was thermally decomposed due to low thermal stability.

Comparative Example 9: Polymerization of Polyalkylene Carbonate without a Thermostable Resin The polyalkylene carbonate was prepared in the same manner as in Example 12, but the blending process with the thermostable resin was omitted.

Thereafter, MC was volatilized and sequentially the extrusion using a die was performed at the same time under the conditions that the number of revolutions of the main screw (ø40) of the twin-screw extruder (L/D=60) was 100 rpm, the temperature of the twelve screw zones was 80 to 140° C., and the temperature of the die hole was 170° C.

At this time, the molecular weight of the polyalkylene carbonate (i.e., PEC) without thermal stability was 192 kg/mol and 102 kg/mol before and after the twin-screw extruder, and the content of the cyclic alkylene carbonate as a byproduct was 0.7 wt % and 3.2 wt %, respectively.

From the above results, the decrease in the molecular weight before and after the extrusion and the increase in the content of the cyclic alkylene carbonate indicate that the polyalkylene carbonate without thermal stability was decomposed.

As shown in Table 1, since the moisture content of MC was not compensated in Comparative Examples 1 to 3, the weight average molecular weight was excessively high even though the selectivity of the polyethylene carbonate was high.

On the other hand, in Examples 1 to 5 of the present disclosure, the moisture content of MC was adjusted to 21 to 234 ppm, and the molecular weight of the polyalkylene carbonate resin obtained by polymerization could be controlled within the range of 135 to 404 kg/mol. That is, according to the present disclosure, a polyethylene carbonate resin having a targeted molecular weight can be obtained by artificially controlling the moisture content.

TABLE 2

Evaluation of thermal stability by solution-blending

|  |  | Comparative Ex. 6 | Example 12 | Example 13 |
|---|---|---|---|---|
| Cat. | kg | 4 | 2.5 | 4 |
| EO | kg | 100 | 100 | 100 |
| MC | kg | 303 | 300 | 304 |
| $CO_2$ pressure | bar | 30 | 30 | 30 |
| Duration of polymerization | hr | 6 | 6 | 6 |
| Moisture content of solvent | ppm | 51 | 89 | 75 |
| Main screw | rpm | 100 | 100 | 100 |
| Vacuum | Torr | 480 | 480 | 480 |
| Temp. of screw zone | ° C. | 80~120 | 80~140 | 80~135 |
| Temp. of die | ° C. | 165 | 170 | 168 |
| NMR analysis |  |  |  |  |
| Content of compounding PLA | wt % | 0 | 7.3 | 3.4 |
| EC content before extrusion | wt % | 0.59 | 0.78 | 1.28 |
| EC content after extrusion | wt % | 8.67 | 0.75 | 1.38 |

As described above, the results of Table 2 show that Comparative Example 6 was less heat-stable than Examples 12 and 13, and had high content of byproducts after extrusion, because the solution-blending using PLA was not carried out.

TABLE 1

Evaluation of change in molecular weight and selectivity according to moisture content

|  |  | Comparative Ex. | | | Example | | | | |
|---|---|---|---|---|---|---|---|---|---|
|  |  | 1 | 2 | 3 | 1 | 2 | 3 | 4 | 5 |
| Cat. | kg | 3 | 1.5 | 3 | 3 | 3 | 4 | 3.5 | 4 |
| EO | kg | 67 | 101 | 67 | 100 | 67 | 100 | 240 | 240 |
| MC | kg | 325 | 300 | 330 | 300 | 330 | 300 | 240 | 240 |
| $CO_2$ pressure | bar | 174 | 142 | 157 | 159 | 147 | 164 | 143 | 194 |
|  | | 30 | 30 | 35 | 30 | 30 | 30 | 30 | 30 |
| Temperature | ° C. | 70 | 70 | 85 | 70 | 70 | 70 | 70 | 70 |
| Moisture content of MC | ppm | 5 | 7 | 5 | 21 | 68 | 103 | 129 | 234 |
| Duration of polymerization | hr | 6 | 6 | 6 | 6 | 6 | 6 | 6 | 6 |
| Weight average molecular weight | kg/mol | 653 | 616 | 660 | 404 | 240 | 192 | 158 | 135 |
| NMR (wt %) | PEC | 95 | 92 | 91 | 95 | 93 | 93 | 93 | 92 |

TABLE 3

Evaluation of thermal stability by compounding

|  |  | Comp. Ex. 7 | Comp. Ex. 8 | Comp. Ex. 9 | Example 14 | Example 15 |
|---|---|---|---|---|---|---|
| Main screw | rpm | 67 | 67 | 100 | 67 | 67 |
| Vacuum | Torr | 6 | 4 | 480 | 4 | 4 |
| Temp. of screw zone | ° C. | 80~170 | 80~200 | 80~140 | 80~200 | 80~200 |
| Temp. of die | ° C. | 170 | 200 | 170 | 200 | 200 |
| NMR analysis Content of compounding PLA | wt % | 0 | 0 | 0 | 10 | 30 |
| EC content before extrusion | wt % | 6.6 | 6.6 | 0.7 | 3.02 | 2.06 |
| EC content after extrusion | wt % | 11.34 | 19.76 | 3.2 | 1.15 | 0.85 |
| Molecular weight before extrusion | kg/mol | 111 | 111 | 192 | 73 | 83 |
| Molecular weight after extrusion | kg/mol | 85 | 62 | 102 | 75 | 78 |

As shown in the results of Table 3, Comparative Examples 7 to 9 had much lower thermal stability than Examples 14 and 15, and many byproducts were generated, since the solution-blending using PLA was not carried out.

Although specific parts of the invention have been described in detail, it would be obvious to the person having ordinary skill in the art that such specific descriptions are no more than preferable embodiments, and the scope of the invention is not limited thereto. Thus, the scope of the invention is defined by the attached claims and equivalents thereof.

What is claimed is:

1. A method of preparing a resin composition containing a polyalkylene carbonate, comprising the steps of:
    (a) polymerizing a polyalkylene carbonate using a zinc-based catalyst, a solvent, carbon dioxide, and an epoxide compound;
    (b) recovering unreacted residual monomers from a polymerization solution obtained after the step (a) which contains the polyalkylene carbonate, unreacted residual monomers, a catalyst residue, the solvent, and cyclic alkylene carbonate-based byproducts;
    (c) removing the catalyst residue from the polymerization solution obtained after the step (b) and recovering raw materials of the catalyst;
    (d) solution-blending by mixing the polymerization solution obtained after the step (c) which contains the polyalkylene carbonate, the solvent, and the cyclic alkylene carbonate-based byproducts with a thermostable blending resin to prepare a resin composition containing the polyalkylene carbonate;
    (e) recovering the solvent from the resin composition containing the polyalkylene carbonate; and
    (f) removing the cyclic alkylene carbonate-based byproducts from the resin composition containing the polyalkylene carbonate.

2. The method of claim 1,
    wherein the step (a) of polymerizing further comprises controlling the molecular weight of the polyalkylene carbonate resin obtained by polymerization by controlling the moisture content in the reaction mixture before initiation of the polymerization reaction to 10 to 1000 ppm.

3. The method of claim 1,
    wherein the step (b) of recovering unreacted residual monomers comprises removing the unreacted residual monomers from the polymerization solution by using a venting method, a simple flash drum, a falling film evaporator, a thin film evaporator, or a combination thereof.

4. The method of claim 1,
    wherein the step (c) of removing the catalyst residue comprises removing the catalyst residue from the polymerization solution by a method using an ion exchange resin, a filtration method selected from the group consisting of a metal filter, a polymer filter, and a centrifuge, or a combination thereof.

5. The method of claim 1,
    wherein the step (c) of recovering raw materials of the catalyst comprises removing the catalyst residue from the polymerization solution by using an ion exchange resin, precipitating the raw materials of the catalyst on the surface of the ion exchange resin, and recovering the raw materials of the catalyst by using water, or recovering the catalyst from the polymerization solution by using a metal filter, a polymer filter, or a centrifuge, passing through an ion exchange resin to precipitate the raw materials of the catalyst on the surface of the ion exchange resin, and recovering the raw materials of the catalyst by using water.

6. The method of claim 1,
    wherein the step (d) of solution-blending comprises preparing a resin composition containing the polyalkylene carbonate by adding the thermostable blending resin dissolved in the solvent into the polymerization solution containing the polyalkylene carbonate by using a stirrer mixer, a tank reactor, or an extruder to make the weight ratio of the polyalkylene carbonate to the thermostable blending resin of 99:1 to 10:90, and then solution-blending.

7. The method of claim 1,
    wherein the blending resin comprises at least one selected from the group consisting of polylactide, polymethyl methacrylate, and cellulose acetate.

8. The method of claim 1,
wherein the step (e) of recovering the solvent comprises recovering the solvent in a content of at least 60 wt% in the polymerization solution by volatilizing the solvent while extruding or kneading the polymerization solution through a co-extrusion or kneading method using a twin-screw extrusion devolatilizer or a kneader-type devolatilizer at a temperature of 40° C. to 150° C. and atmospheric pressure to a vacuum.

9. The method of claim 1,
wherein the step (f) of removing the byproducts comprises removing the byproducts and the remaining solvent from the polymerization solution using an extrusion devolatilizer or a kneader-type devolatilizer at a temperature of 120° C. to 200° C. and a degree of vacuum of 1 Torr to 500 Torr.

10. The method of claim 1,
wherein after the step (f) of removing the byproducts, the method further comprises the step (g) of obtaining the resin composition containing the polyalkylene carbonate in the form of pellets through a pelletizing process and a drying process of the resin composition containing the polyalkylene carbonate in which byproducts were removed.

11. The method of claim 10,
wherein after the step of obtaining the resin composition containing the polyalkylene carbonate in the form of pellets, the method comprises the step of further compounding and pelletizing the pelletized resin composition containing the polyalkylene carbonate with the thermostable compounding resin.

12. The method of claim 1,
wherein a final resin composition comprises the polyalkylene carbonate having a metal content of the catalyst of less than 300 ppm, a solvent content of 0.5 wt% or less, and a cyclic alkylene carbonate byproducts content of 2 wt% or less.

13. The method of claim 1,
wherein the steps of polymerizing to removing the byproducts are carried out by a continuous or batch type of process.

14. The method of claim 1,
wherein the zinc-based catalyst is a zinc dicarboxylate-based catalyst prepared by reacting a zinc-based precursor with a C3 to C20 dicarboxylic acid.

15. The method of claim 1,
wherein the epoxide compound is at least one selected from the group consisting of: a C2 to C20 alkylene oxide substituted or unsubstituted with a halogen or a C1 to C5 alkyl group;
a C4 to C20 cycloalkylene oxide substituted or unsubstituted with a halogen or a C1 to C5 alkyl group; and a C8 to C20 styrene oxide substituted or unsubstituted with a halogen or a C1 to C5 alkyl group, and
the solvent is at least one selected from the group consisting of methylene chloride, 1,2-dichloroethane, n-methyl pyrrolidone, dimethylsulfoxide, 1,4-dioxane, and 1,3-dioxolane.

16. The method of claim 1,
wherein a molar ratio of the epoxide compound to the zinc-based catalyst is 50:1 to 400:1 in the polymerization step, and the polymerization is carried out at a polymerization temperature of 50 to 90° C. and a polymerization pressure of 15 to 50 bar for 1 to 60 hours.

* * * * *